(12) United States Patent
Burdock et al.

(10) Patent No.: US 6,282,471 B1
(45) Date of Patent: Aug. 28, 2001

(54) VEHICLE ROLL CONTROL

(75) Inventors: William Burdock, Sutton Coldfield; David Andrew Clare, Banbury, both of (GB)

(73) Assignee: Land Rover Group Limited, Jersey (GB)

(*) Notice: Subject to any disclaimer, the term of this patent is extended or adjusted under 35 U.S.C. 154(b) by 0 days.

(21) Appl. No.: 09/700,630

(22) Filed: Nov. 17, 2000

(30) Foreign Application Priority Data

Jun. 9, 1998 (GB) .................................. 9812264

(51) Int. Cl.⁷ .................................. B60G 21/055
(52) U.S. Cl. .................................. 701/38; 180/282
(58) Field of Search .................................. 701/38, 41, 71, 701/72, 48; 180/282

(56) References Cited

FOREIGN PATENT DOCUMENTS

| | | |
|---|---|---|
| 40 19 732 A1 | 1/1991 | (DE) . |
| 196 07 050 A1 | 8/1997 | (DE) . |
| 196 15 311 A1 | 10/1997 | (DE) . |
| 0 234 552 A1 | 9/1987 | (EP) . |
| 0 234 808 A2 | 9/1987 | (EP) . |
| 0 283 004 A3 | 9/1988 | (EP) . |
| 0 689 116 A2 | 12/1995 | (EP) . |
| 2 234 211 A | 1/1991 | (GB) . |

*Primary Examiner*—Richard M. Camby
(74) *Attorney, Agent, or Firm*—Davis & Bujold, P.L.L.C.

(57) ABSTRACT

An active vehicle roll control system is disclosed in which a roll bar (22) has two halves (22a, 22b) which can be locked together to allow the system to operate passively. A sensing system based on a lateral accelerometer and vehicle speed sensor is arranged to detect when the vehicle is on a side slope and to put the roll control system into the passive mode.

16 Claims, 3 Drawing Sheets

VEHICLE ROLL CONTROL

FIELD OF THE INVENTION

The present invention relates to active suspension systems for vehicles, and in particular to such systems which include active roll control.

BACKGROUND OF THE INVENTION

It can be a problem with active suspension control systems, particularly in off-road vehicles that they do not respond suitably when the vehicle is traversing a steep side slope. This is because, in conventional systems, the presence of a side slope cannot be detected and the system therefore responds to a side slope as if the vehicle were cornering. This can result in the consumption of a lot of power as the system tries to compensate for what can be the equivalent of severe vehicle roll but which can last for long periods of time. This is because the vehicle can continue to traverse the side slope for a considerable length of time whereas severe roll is generally only present for short periods.

It is known from EP 0 283 004 to provide a vehicle roll control system in which the roll control mechanism is modified in dependence on the speed of the vehicle. However, this system still does not address the problem of roll control on a side slope.

SUMMARY OF THE INVENTION

EP 0 689 116 discloses a system for detecting side slopes traversed by a vehicle using measurements of lateral acceleration and wheel speeds which in turn are used to determine vehicle speed and yaw rate.

DE 196 07 050 discloses a side slope detection system which uses a yaw sensor and wheel speed sensors.

DE 40 19 732 discloses a roll control system in which switches from an active to a passive state under high lateral accelerations so as to conserve energy and so as to reduce the power required from the system.

The present invention provides apparatus for detecting traversal of a side slope by a vehicle, the apparatus including an accelerometer arranged to produce an acceleration signal indicative of the lateral acceleration of the vehicle, speed measuring means arranged to produce a speed dependent signal dependent on the speed of the vehicle and control means, characterized in that the apparatus further comprises comparator means arranged to produce a difference signal indicative of the difference between the speed dependent signal and the acceleration signal, and integrating means arranged to integrate the difference signal over time and to produce a side slope detection signal if the integral reaches a predetermined value.

The speed dependent signal can vary only with the vehicle speed. Alternatively, if the vehicle includes a sensor for measuring steering angle the speed dependent signal can also be dependent on the steering angle.

Preferably the speed dependent signal is arranged to vary with the square of the vehicle speed. This gives the best indication of cornering acceleration because the cornering acceleration varies with the square of the speed of the vehicle.

The present invention further provides a vehicle suspension system including roll control means for controlling roll of the vehicle and apparatus according to the invention for detecting traversal of a side slope by a vehicle. Preferably the roll control means has active and passive modes and is arranged to respond to detection of a side slope by operating in the passive mode. Preferably the roll control means includes a hydraulic circuit including a pump which is arranged to provide hydraulic pressure for use in active roll control when the roll control means is in the active state but which can be turned off or operate at reduced power when the roll control means is in the passive state.

The roll control means may include a roll bar having two parts which can be moved relative to each other to control roll when the roll control means is in the active state and which can be locked together when the roll control system is in the passive state.

Preferably the roll control means is arranged to switch from the passive mode to the active mode if the vehicle speed exceeds a predetermined threshold speed while the roll control means is in the passive mode. This is because at higher speeds it can be assumed that the vehicle is no longer on a steep side slope and that normal roll control will be required.

Preferably the system further comprises means for producing a high speed signal when the vehicle speed exceeds said threshold speed, and wherein the high speed signal is input to the comparator means which is arranged to respond by altering the difference signal as if a speed signal indicative of a high vehicle speed or a lateral acceleration signal indicative of low lateral acceleration had been received.

BRIEF DESCRIPTION OF THE DRAWINGS

Preferred embodiments of the present invention will now be described by way of example only with reference to the accompanying drawings in which.

DESCRIPTION OF THE PREFERRED EMBODIMENTS

Figure 1:
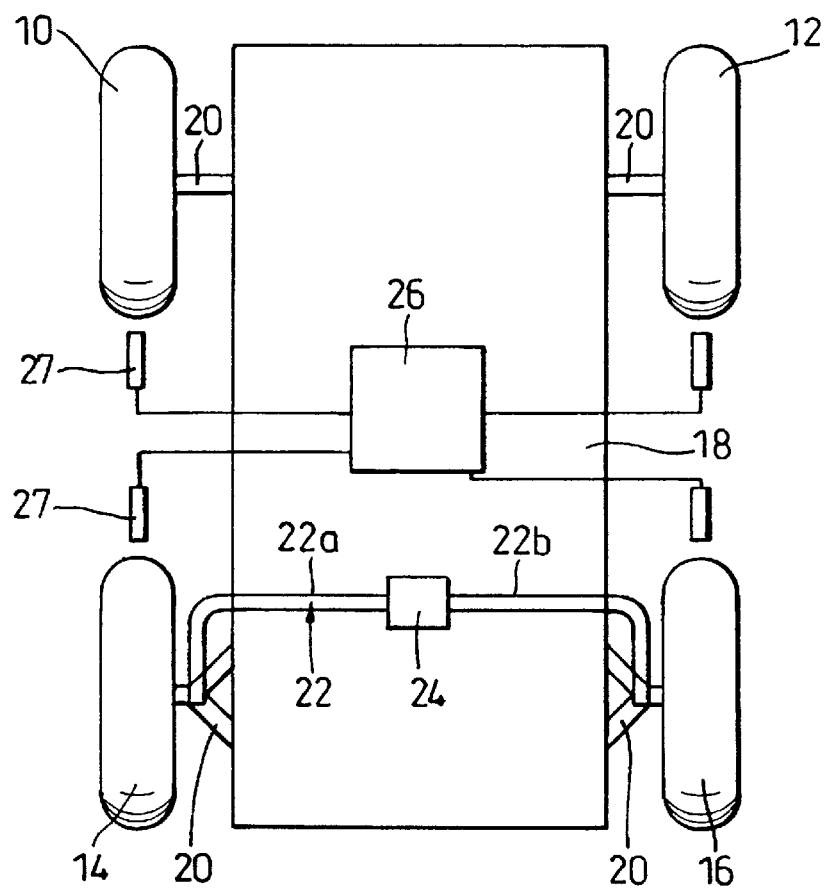
FIG. 1 is a diagrammatic representation of a vehicle including a suspension according to an embodiment of the invention.

Referring to FIG. 1, a vehicle has four wheels 10, 12, 14, 16 each mounted on the vehicle body 18. The vehicle has an independent suspension, each of the wheels being attached to the body 18 through a suspension arm 20 so that it can move vertically relative to the body 18. A roll bar 22 is connected between the two rear wheels 14, 16 to control the roll of the rear of the vehicle. The roll bar 22 is split in the middle into two halves 22a, 22b which can be rotated relative to each other by a rotary actuator 24 under the control of a control unit 26. This enables vehicle roll to be controlled actively in response to signals input to the control unit from wheel speed sensors 27 and a number of accelerometers which provide signals indicative of the acceleration of parts of the vehicle body in various directions. A similar roll bar, which is not shown, would also normally be connected between the front wheels 10, 12.

Figure 2:
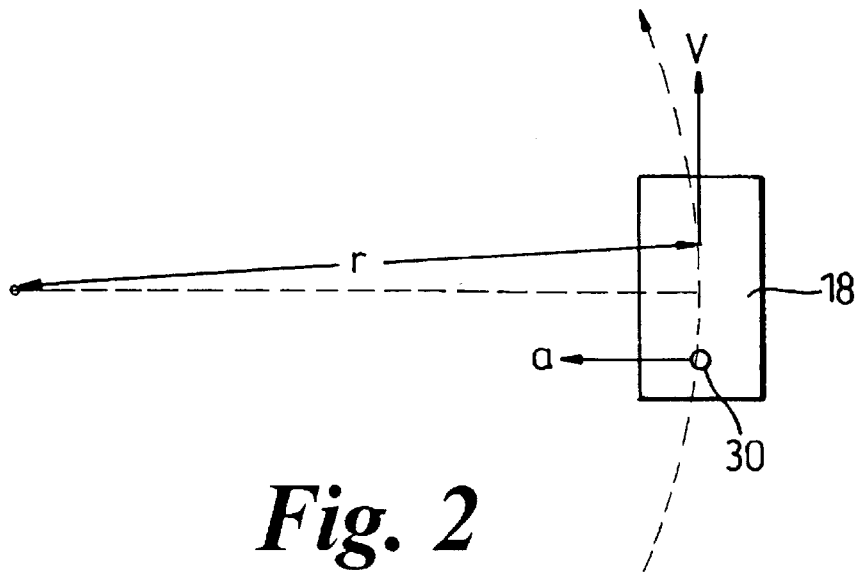
FIG. 2 is a plan view of the vehicle of FIG. 1 whilst cornering.

Referring to FIG. 2, one of the sensors is a lateral accelerometer 30 arranged to measure the acceleration of the vehicle body in the lateral direction, i.e. the horizontal direction perpendicular to the normal direction of travel. As shown in FIG. 2, when the vehicle is cornering the lateral accelerometer 30 detects a lateral acceleration a which is given by the formula $a=v^2/r$ where a is the acceleration, v is the speed of the vehicle in the forward direction and r is the radius of the arc through which the vehicle is turning.

Figure 3:
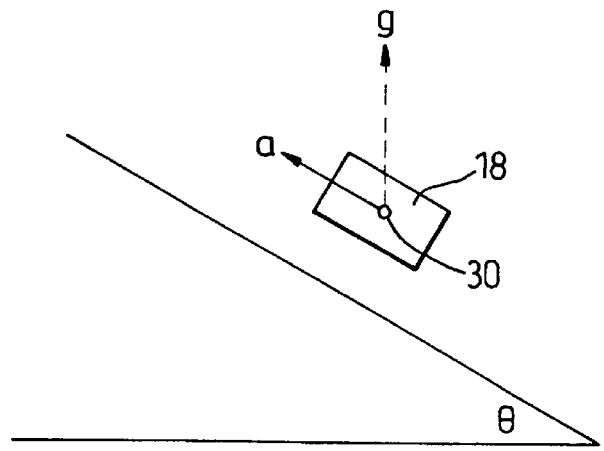
FIG. 3 is an end view of the vehicle of FIG. 1 whilst traversing a side slope.

Referring to FIG. 3. when the vehicle is travelling on a side slope at an angle θ to the horizontal the accelerometer measures a lateral acceleration a which is given by the formula $a=g \sin\theta$ where g is the acceleration due to gravity (9.8 ms$^{-2}$).

The system is required to distinguish between when the vehicle is traversing a steep side slope, which will generally only happen at low vehicle speeds when the vehicle is travelling off road, and when it is cornering hard, which will generally only happen at higher speeds on road.

Figure 4:
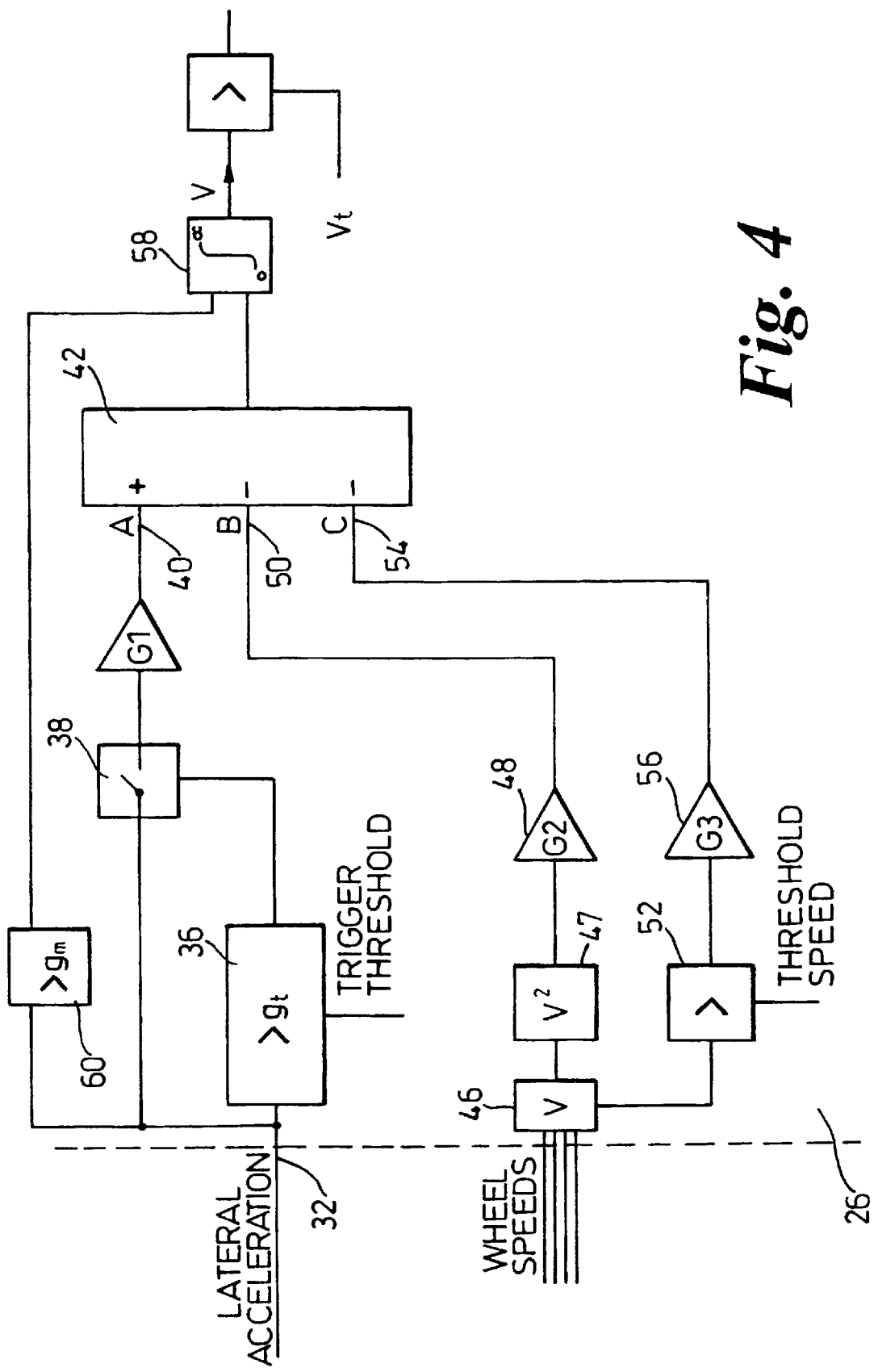
FIG. 4 is a diagrammatic representation of the control unit of the system of FIG. 1.

Referring to FIG. 4, the control unit 26 has one input 32 which receives a lateral acceleration signal from the lateral accelerometer 30 and another set of inputs 34 which receive signals from the wheel speed sensors 27. The lateral acceleration signal is input to a comparator 36 and compared with a threshold signal. If the measured lateral acceleration is greater than the threshold value $g_t$, the comparator 36 closes a switch 38 connecting the lateral acceleration signal to a first input 40 of a comparator 42 via an amplifier 44 having a gain G1.

The four wheel speed signals are input to a circuit 46 which calculates the vehicle speed from them in a known manner and produces a vehicle speed signal proportional to the speed of the vehicle. The vehicle speed signal is input to a squaring device 47 which produces a squared signal which varies with the square of the vehicle speed, and which is input via an amplifier 48 of gain G2 to a second input 50 of the comparator 42.

The road speed signal is also input to a comparator 52 which compares it with a threshold speed signal. If the vehicle speed is above the threshold speed determined by the threshold signal, the comparator 52 produces a high speed signal which is input to a third input 54 of the comparator 42 via an amplifier 56 of gain G3.

Assuming that the vehicle speed is below the threshold speed such that there is no input to the third input 54 of the comparator, the comparator 42 compares the signals at its first and second inputs 40, 50 and produces a difference signal equal to the difference between the acceleration signal and the squared speed signal. This difference signal therefore gives an indication of the instantaneous side slope inclination being traversed by the vehicle. Clearly to provide an exact instantaneous measurement of side slope the steering angle of the front steerable wheels of the vehicle would need to be taken into account. However this requires a separate steering angle sensor, which adds to the cost of the system, and the arrangement described above has been found to be sufficiently accurate for most a purposes.

The difference signal, which is positive when the lateral acceleration signal is greater than the squared speed signal and negative when the squared speed signal is greater than the lateral acceleration signal, is then input to an integrator 58 which continually integrates the difference signal over time. The integrator is arranged so that the integral signal can only have positive values. When it falls to zero it remains there until the difference signal is positive again. The integral signal is also limited to a maximum value so that, when the vehicle comes off a side slope, the integral signal will fall to zero again within a reasonable period.

If the vehicle speed is greater than the threshold speed the high speed signal is input to the comparator 42 via the amplifier 56. The gain G3 of this amplifier is relatively high compared to that G1, G2 of the other two amplifiers. The comparator deducts the value of the high speed signal from the difference between the lateral acceleration signal and the squared speed signal to produce a modified difference signal. The result of this is that, if the vehicle speed exceeds the threshold speed the difference signal goes to a relatively high negative value causing the integral signal to drop rapidly to zero.

The lateral acceleration is also monitored by a comparator 60 and if it exceeds a predetermined high level $g_m$ a signal to the integrator 58 resets the system to normal operation. This level is set to be slightly less than the maximum which can be experienced on a side slope without the vehicle rolling over. If this level of lateral acceleration is experienced it must either be due to some manoeuvre other than the traversing of a side slope, in which case normal roll control will be required, or to an extreme side slope, in which case the normal anti-roll control may help to prevent the vehicle from rolling over.

Figure 5:
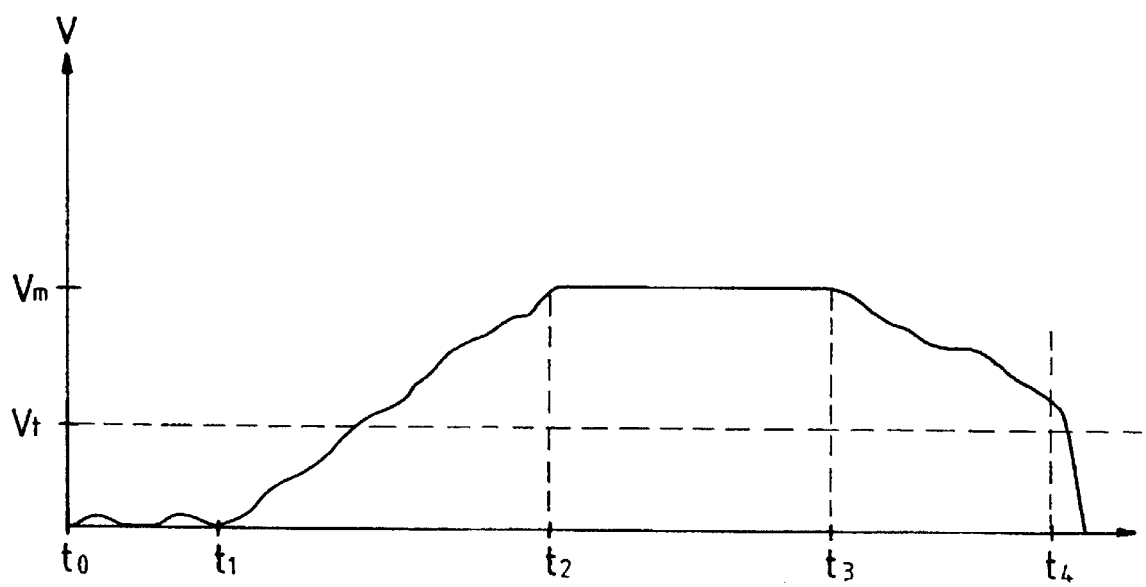
FIG. 5 is a graph showing changes in time in the output from part of a control circuit of the vehicle of FIG. 1.

It will be appreciated that the integral signal will vary over time dependent on the cornering and side slope which the vehicle experiences in a manner illustrated in FIG. 5.

Referring to FIG. 5, which shows variations in the integral signal V over time, between times $t_0$ and $t_1$ the vehicle is travelling over a rough off-road surface with little permanent side slope. Under these conditions when there is a high measured lateral acceleration it is due to cornering or unevenness in the terrain and does not last for long periods. Therefore when the difference signal does go positive, it quickly returns to zero. At time $t_1$ the vehicle encounters a side slope so the measured lateral acceleration rises and remains at a high level whilst still varying due to vehicle roll and cornering. The difference signal therefore starts to rise. When the difference signal reaches a threshold value $V_t$ the control unit 26 determines that the vehicle is on a side slope and locks the two halves of the rotary actuator 24 together. This locks the two halves of the anti-roll bar together so that it acts like a normal, one-piece anti-roll bar. This puts the roll control system into passive mode and effectively reduces the power required by the rotary actuator to zero. At time $t_2$ the integral signal reaches a maximum value $V_m$ and is held there while the difference signal remains positive. At time $t_3$ the vehicle comes off the side slope and the lateral acceleration therefore drops. The difference signal becomes negative and the integral signal starts to fall. At time $t_4$ the vehicle speed exceeds the threshold speed so the high speed signal is input to the comparator 42 and the difference signal takes a high negative value. The integral signal therefore drops rapidly to zero. As the integral signal passes through the threshold value $V_t$ the rotary actuator 24 is unlocked and the roll control system becomes active again.

It will be appreciated that the control algorithms described above can be used in various types of active roll control systems. For example the system described in our co-pending international application No. PCT/GB97/03314 which uses a hydraulic linear actuator in place of the rotary actuator described above can include the features of the present invention. It can also be applied in fully hydraulic or pneumatic suspension systems in which the active roll control is provided by applying controlled fluid pressure to vertical actuators at each wheel.

What is claimed is:

1. An apparatus for detecting traversal of a side slope by a vehicle as the vehicle travels at a vehicle speed and experiences a lateral acceleration, the apparatus including an accelerometer arranged to produce an acceleration signal indicative of the lateral acceleration, speed measuring means arranged to produce a speed dependent signal dependent on the vehicle speed, comparator means arranged to compare the speed dependent signal and the acceleration signal and to produce a difference signal indicative of the difference therebetween, and integrating means arranged to integrate the difference signal over time and to produce a side slope detection signal if the integral reaches a predetermined value.

2. The apparatus according to claim 1, wherein the speed dependent signal is arranged to vary with the square of the vehicle speed.

3. A vehicle suspension system including roll control means for controlling roll of the vehicle and apparatus according to claim 1 for detecting traversal of a side slope by a vehicle.

4. The system according to claim 3, wherein the roll control means has active and passive modes, and the roll control means is arranged to respond to detection of a side slope by operating in the passive mode.

5. The system according to claim 3, wherein the roll control means includes a hydraulic circuit including a pump which is arranged to provide hydraulic pressure for use in active roll control when the roll control means is in the active state but which can be turned off or operate at reduced power when the roll control means is in the passive state.

6. The system according to claim 3, wherein the roll control means includes an anti-roll bar having two parts which can be moved relative to each other to control roll when the roll control means is in the active state and which can be locked together when the roll control means is in the passive state.

7. The system according to claim 3, wherein the roll control means is arranged to switch from the passive mode to the active mode if the vehicle speed exceeds a predetermined threshold speed while the roll control means is in the passive mode.

8. The system according to claim 7 further comprising means for producing a high speed signal when the vehicle speed exceeds said threshold speed, and wherein the high speed signal is input to the comparator means which is arranged to respond by altering the difference signal as if a speed signal indicative of a high vehicle speed or a lateral acceleration signal indicative of low lateral acceleration had been received.

9. The apparatus for detecting traversal of a side slope by a vehicle as the vehicle travels at a vehicle speed and experiences a lateral acceleration, the apparatus including an accelerometer arranged to produce an acceleration signal indicative of the lateral acceleration, a speed sensor arranged to produce a speed dependent signal dependent on the vehicle speed, a comparator arranged to compare the speed dependent signal and the acceleration signal and to produce a difference signal indicative of the difference therebetween, and an integrator arranged to produce an integral over time of the difference signal and to produce a side slope detection signal if the integral reaches a predetermined value.

10. The apparatus according to claim 9, wherein the speed dependent signal is arranged to vary with the square of the vehicle speed.

11. The vehicle suspension including a roll control system for controlling roll of the vehicle and apparatus according to claim 9 for detecting traversal of a side slope by a vehicle.

12. The system according to claim 11, wherein the roll control system has active and passive modes, and the roll control system is arranged to respond to detection of a side slope by operating in the passive mode.

13. The system according to claim 12, wherein the roll control system includes a hydraulic circuit including a pump which is arranged to provide hydraulic pressure for use in active roll control when the roll control system is in the active state but which can be turned off or operate at reduced power when the roll control means is in the passive state.

14. The system according to claim 12, wherein the roll control system includes an anti-roll bar having two parts which can be moved relative to each other to control roll when the roll control system is in the active state and which can be locked together when the roll control system is in the passive state.

15. The system according to claim 12, wherein the roll control system is arranged to switch from the passive mode to the active mode if the vehicle speed exceeds a predetermined threshold speed while the roll control system is in the passive mode.

16. The system according to claim 15 further comprising a further comparator for comparing the vehicle speed with a threshold speed and producing a high speed signal when the vehicle speed exceeds said threshold speed, and wherein the high speed signal is input to the comparator which is arranged to respond by altering the difference signal as if at least one of a speed signal indicative of a high vehicle speed, and a lateral acceleration signal indicative of low lateral acceleration, had been received.

\* \* \* \* \*